(12) United States Patent
Sichner

(10) Patent No.: US 7,412,548 B2
(45) Date of Patent: Aug. 12, 2008

(54) INTELLIGENT SELF-DETERMINING I/O DEVICE

(75) Inventor: Gregg M. Sichner, Mentor, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 439 days.

(21) Appl. No.: 10/793,236

(22) Filed: Mar. 4, 2004

(65) Prior Publication Data

US 2005/0198406 A1 Sep. 8, 2005

(51) Int. Cl.
*G06F 3/00* (2006.01)
*G06F 13/12* (2006.01)
*G06F 13/00* (2006.01)

(52) U.S. Cl. .................. 710/62; 710/8; 710/10; 710/14; 710/63

(58) Field of Classification Search ............... None
See application file for complete search history.

(56) References Cited

U.S. PATENT DOCUMENTS

| | | | |
|---|---|---|---|
| 6,175,770 B1 | 1/2001 | Bladow | |
| 6,175,932 B1 * | 1/2001 | Foote et al. ............ | 714/9 |
| 6,286,060 B1 * | 9/2001 | DiGiorgio et al. ........ | 710/31 |
| 6,308,231 B1 | 10/2001 | Galecki et al. | |
| 6,484,215 B1 | 11/2002 | Gibart et al. | |
| 6,662,247 B1 | 12/2003 | Ales et al. | |
| 6,909,923 B2 * | 6/2005 | Vasko et al. ............ | 700/79 |
| 6,934,788 B2 * | 8/2005 | Laity et al. ............ | 710/303 |
| 7,054,963 B2 * | 5/2006 | Betts-LaCroix et al. ...... | 710/62 |
| 2006/0095616 A1 * | 5/2006 | Ahern et al. ............ | 710/62 |

FOREIGN PATENT DOCUMENTS

| | | |
|---|---|---|
| DE | 35 34 465 A1 | 4/1987 |
| EP | 0 620 510 A1 | 4/1993 |

* cited by examiner

*Primary Examiner*—Henry W. H. Tsai
*Assistant Examiner*—Scott Sun
(74) *Attorney, Agent, or Firm*—Fay Sharpe LLP; R. Scott Speroff

(57) ABSTRACT

A universal input/output device for an industrial automation control system includes a housing, a power supply for connecting to a voltage source, an input/output circuit for communicating with an industrial process, and a network adapter circuit for communicating data to and from a data network. The device also includes a backplane communication circuit for sending backplane data upstream and downstream along a backplane, and a device setup control circuit. The device setup control circuit performs an initialization process to configure said device as one of: (i) a stand-along block I/O device; (ii) a network adapter module of a modular I/O device; or (iii) an I/O module of a modular I/O device. The configuration method is automatic and based upon data being received into the device.

5 Claims, 5 Drawing Sheets

INTELLIGENT SELF-DETERMINING I/O DEVICE

BACKGROUND

The present development relates to an intelligent self-determining input/output (I/O) device and to an industrial automation control system including same. Industrial automation control systems comprise an industrial controller, which is a special purpose computer used for controlling industrial processes and manufacturing equipment on a real-time basis. Under the direction of a stored program, the industrial controller examines a set of inputs reflecting the status of the controlled process and changes a set of outputs controlling the industrial process. The inputs and outputs may be binary or analog. Typically, analog signals are converted to binary data for processing.

Industrial controllers differ from conventional computers in that their hardware configurations vary significantly from application to application reflecting their wide range of uses. This variability is accommodated by constructing the industrial controller on a modular basis having removable input and output (I/O) modules that may accommodate different numbers of input and output points depending on the process being controlled. The need to connect the I/O modules to different pieces of machinery that may be spatially separated has led to the development of distributed I/O systems that take a variety of forms. In one example, a single discrete or "block" I/O module is located where desired. The block I/O module contains digital or analog I/O circuits, a built-in power supply, and a built-in network adapter for communicating with the industrial controller. In another example, the distributed I/O installation is modular in the sense that a single network adapter module is connected to the data network, and one or more I/O modules, as needed, are connected to the adapter module for communication with the industrial controller through the single network adapter module.

One drawback associated with known industrial automation control systems is that the I/O modules and associated adapter modules must be supplied in numerous different configurations in terms of the electrical connectors, the internal digital/analog I/O circuitry, the enclosure ratings, and the like. As such, it has been deemed desirable to provide an I/O module that functions in both a "block" or stand-alone mode, as well as in a modular mode. This, then, eliminates the need to provide I/O devices in both the block I/O and modular I/O embodiments.

SUMMARY

In accordance with the present development, a universal input/output device for an industrial automation control system includes a housing; a power supply for connecting to a voltage source; an input/output circuit for communicating with an industrial process; a network adapter circuit for communicating data to and from a data network; a backplane communication circuit for sending backplane data upstream and downstream along a backplane; and, a device setup control circuit that performs an initialization process to configure the device as one of: (i) a stand-along block I/O device; (ii) a network adapter module of a modular I/O device; or (iii) an I/O module of a modular I/O device.

In accordance with another aspect of the present development, an industrial automation control system comprises at least two intelligent self-determining I/O devices. Each of said I/O devices comprises a housing; a power supply for connecting to a voltage source; an input/output circuit for communicating with an industrial process; a network adapter circuit for communicating data to and from a data network; a backplane communication circuit for sending backplane data upstream and downstream along a backplane; and, a device setup control circuit that performs an initialization process to configure said device as one of: (i) a stand-along block I/O device; (ii) a network adapter module of a modular I/O device; or (iii) an I/O module of a modular I/O device.

In accordance with a further aspect of the development, a method for constructing an industrial automation control system comprises connecting a plurality of intelligent self-determining I/O devices to a data network. An initialization routine is performed with each of the intelligent self-determining I/O devices. The initialization routine comprises, for each of the intelligent self-determining I/O devices: (a) determining if network data are being received into the device; (b) determining if upstream backplane test data are being received into the device; (c) determining if downstream backplane test data are being received into the device; and, (d) configuring the device as one of (i) a stand-along block I/O device; (ii) a network adapter module of a modular I/O device; or (iii) an I/O module of a modular I/O device based upon whether at least one of network data, upstream backplane test data, and downstream backplane test data are received into the device.

BRIEF DESCRIPTION OF THE DRAWINGS

The development comprises components and arrangements of components, and/or various steps and arrangements of steps, preferred embodiments of which are disclosed herein and shown in the drawings that form a part hereof, wherein.

DETAILED DESCRIPTION

Figure 1:
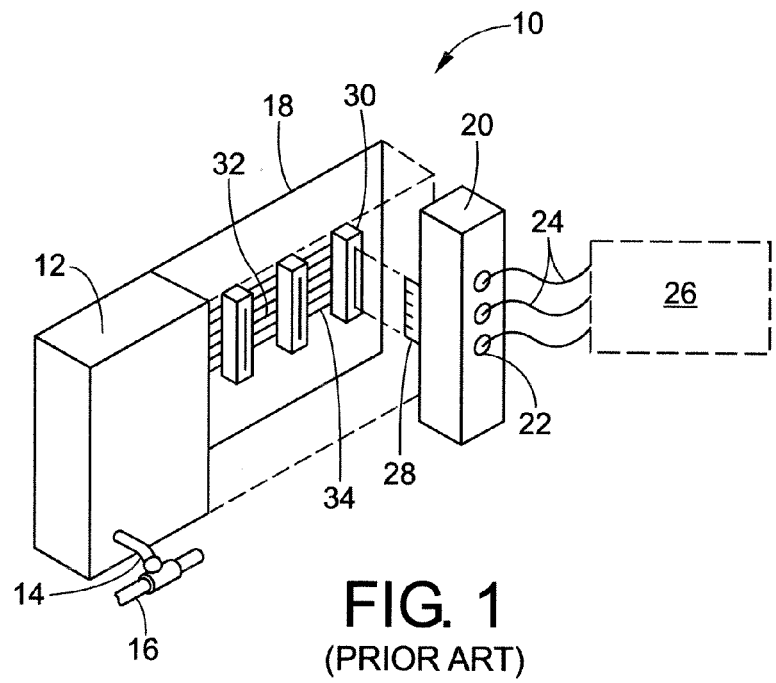
FIG. 1 (prior art) is a simplified perspective view, in partial phantom, of a distributed modular I/O system having an adapter communicating on a backplane to one or more detachable I/O modules.

Referring now to FIG. 1, an I/O system 10 for use with an industrial controller includes a network adapter or network adapter module 12 providing a connection 14 to a high-speed, serial network 16. The network 16 may be any one of a number of high-speed serial networks including ControlNet, EtherNet or the like. The adapter module 12 communicates over the network 16 with an industrial controller (not shown) to receive output data from the industrial controller or to provide input data to the industrial controller to be processed according to a control program.

The adapter module 12 communicates with a backplane 18 to connect it to one or more I/O modules 20. The I/O modules 20 connect via I/O lines (e.g., electrical cables, fiber optic cables, etc.) 24 with a controlled process 26. As is understood in the art, the I/O modules 20 convert digital data received over the backplane 18 from the adapter module 12 into output signals (either digital or analog) in a form suitable for connection to the industrial process 26. The I/O modules 20 typically also receive digital or analog signals from the industrial process 26 and convert it to digital data suitable for transmission on the backplane 18 to the adapter module 12.

Modularity of the I/O system 10 is provided through a rear extending connector 28 on each I/O module 20 which may be mated with any one of a number of connectors 30 extending from the front surface of the backplane 18. The connectors 30 are each associated with "slots" providing mechanical features (not shown) for otherwise securing the I/O module 20.

In the shown parallel bus embodiment, connectors 30 receive parallel data bus conductors 32, over which data may be read and written, and slot address signals 34 which are enabled one at a time to indicate the slot and hence the I/O module 20 for which the data of data bus conductors 32 is intended or from which data is being solicited. The data bus conductors 32 also include control lines including a clock and read/write line indicating timing for a data transfer according to techniques well known in the art.

In an alternative serial bus embodiment, not shown, slot address signals are attached to the data blocks sent over a serial data bus connector or are implicit in the ordering or timing of the data blocks being sent. While the invention is applicable to both serial and parallel bus embodiments, only the former will be discussed in detail from which description the latter will be apparent to those of ordinary skill in the art.

Figure 2:
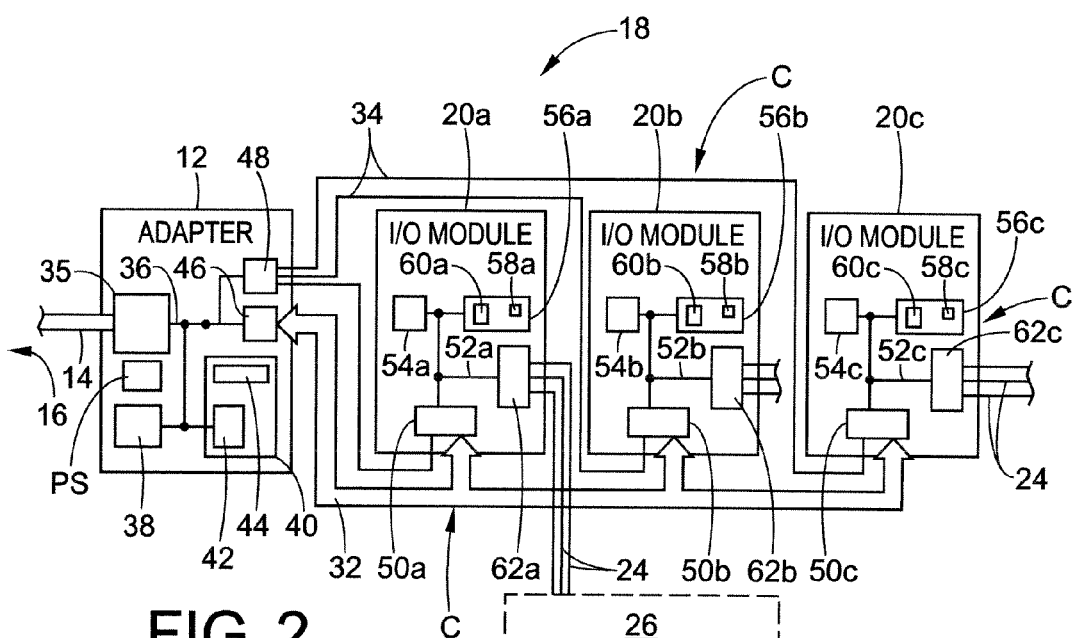
FIG. 2 (prior art) is a block diagram of the distributed I/O system of FIG. 1 showing the interconnection of the adapter to the I/O modules via backplane data conductors and slot address signals.

Referring now to FIG. 2, the adapter module 12 includes a network interface 35 communicating with the connector 14 to decode and encode data exchanged with the network 16. The network interface 35 in turn communicates with an internal bus 36 which connects the network interface 35 to a processor 38 and a memory 40. The memory 40 includes a buffer 42 (divided into input and output sections) and an operating program 44 allowing the processor 38 to operate on the data passing on the internal bus 36 according to the methods of the present invention as will be described. The adapter module 12 also includes a power supply PS.

The internal bus 36 also connects to backplane data interface 46 and backplane address decoder 48. I/O modules 20a-20c, when connected to the backplane 18, communicate with the data bus conductors 32 and slot address signals 34 via a backplane interface 50a-50c, respectively. Each I/O module 20a-20c comprises I/O circuitry C that: (i) connects via I/O lines 24 with a controlled process 26; (ii) converts digital data received over the backplane 18 from the adapter module 12 into output signals (either digital or analog) in a form suitable for connection to the industrial process 26; and/or, (iii) receives digital or analog signals from the industrial process 26 and converts it to digital data suitable for transmission on the backplane 18 to the adapter module 12.

More particularly, in each I/O module 20a-20c, backplane interface 50 (each component denoted a-c to reflect the particular I/O module) in turn communicates with an internal bus 52 (i.e., 52a, 52b, etc.), which communicates with an internal processor 54 and memory 56, the latter which includes a buffer portion 58 and an operating program 60. The internal bus 52 also communicates with I/O circuitry 62 providing level shifting, conversion and filtering necessary for the interface to the controlled process. The backplane interface 50 and address decoders 48 and 46 may be application-specific integrated circuits (ASICs).

Figure 3:
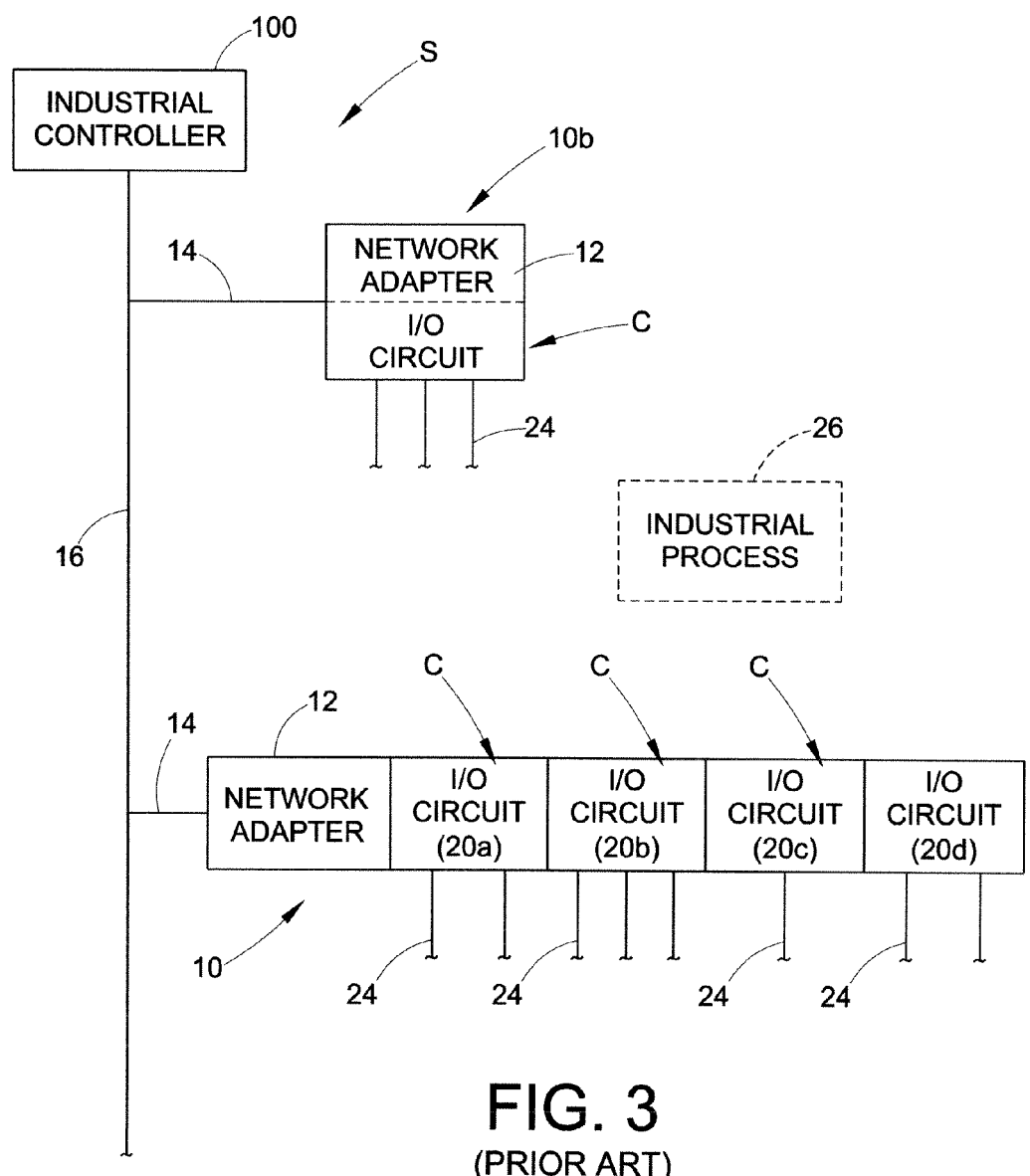
FIG. 3 (prior art) is simplified diagrammatic illustration showing a distributed block I/O module and also the distributed modular I/O system of FIG. 1 as part of an overall industrial automation control system.

As is generally known in the art, the network adapter 12 and at least one of the I/O modules 20a-20c can be integrated into a single enclosure to define a "block" I/O device 10b as shown in FIG. 3. FIG. 3 illustrates the block I/O device 10b and also the modular I/O system 10 of FIGS. 1 and 2 as part of an industrial automation control system S. More particularly, an industrial controller 100 comprising a scanner is connected to the data network 16. The block I/O device 10b and modular I/O system 10 are connected to the network 16 via respective network adapters 12 and are located remotely from the controller 100. As noted above, the modular I/O system 10 comprises multiple I/O modules 20a-20d. The I/O circuits C of the devices 10,10b connect via I/O lines 24 with one or more controlled processes 26. The I/O circuits C convert digital data received from controller 100 via network adapter 12 into output signals (either digital or analog) for input to the industrial process 26. Likewise, the I/O circuits C receive digital or analog signals from the industrial process 26 and convert same to digital data suitable for input to controller 100 via network adapter 12.

A known industrial control system S, such as that illustrated in FIG. 3, can be thought of as comprising three potential types of I/O devices: a block I/O device 10b; a network adapter module 12 of a modular I/O device 10; or, an I/O module 20 of a modular I/O device 10. Also, the I/O modules 20 can be further sub-classified as: a terminal I/O module; or an intermediate I/O module. A "terminal" I/O module is the final or most downstream module (20d in the illustrated example) in a series of modules operably connected to the network adapter module 12; an "intermediate" I/O module is any module 20a-20c located between the network adapter module 12 and the terminal module of the modular I/O device 10. Those of ordinary skill in the art will recognize that the modular I/O system 10 can comprise only the network adapter module 12 and a single I/O module 20, in which case the single I/O module 20 would be deemed the terminal I/O module.

Figure 4:
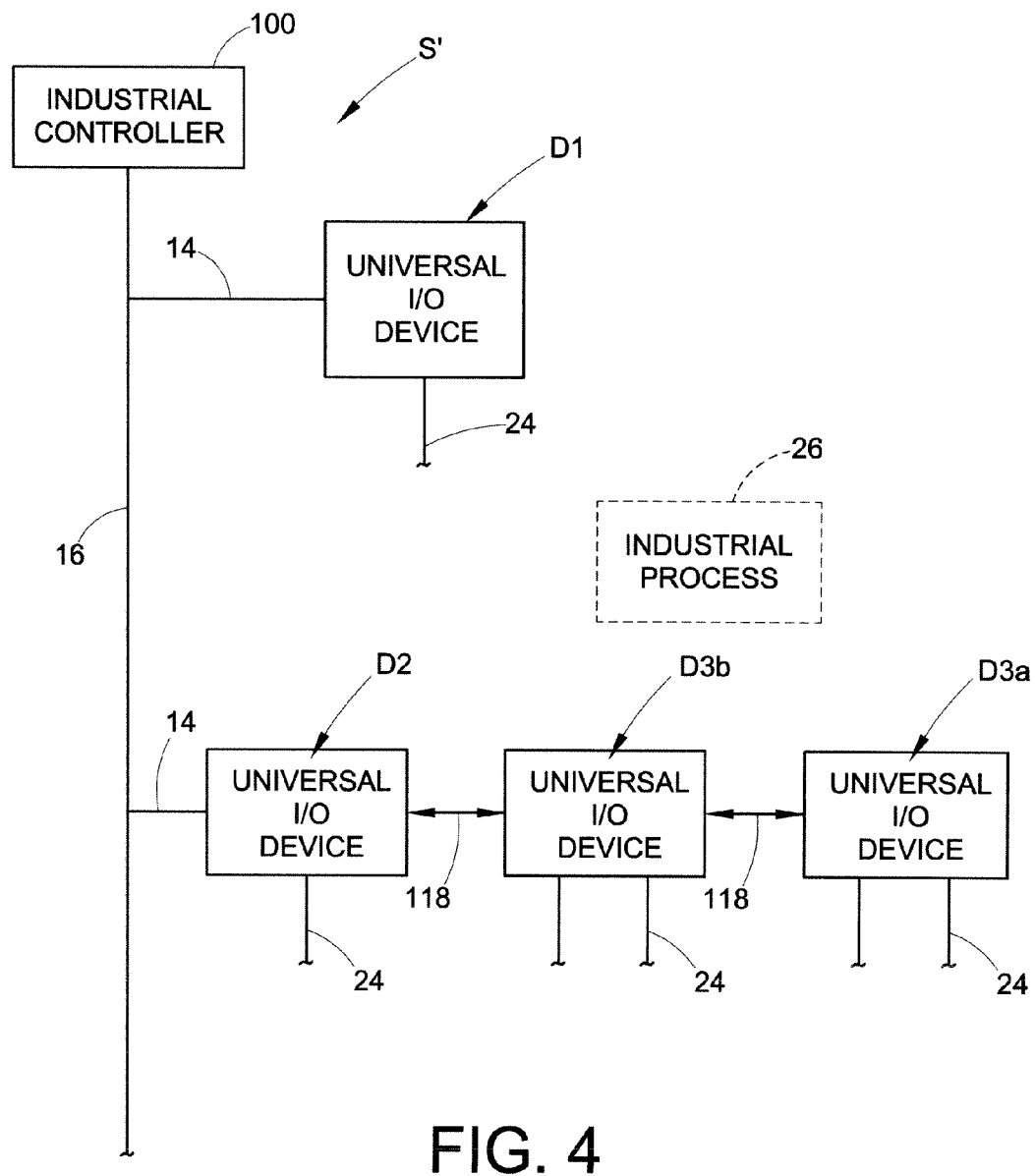
FIG. 4 shows the block I/O module and the modular I/O system of FIGS. 1-3 replaced with intelligent self-determining I/O devices in accordance with the present development.

As shown in FIG. 4, in accordance with the present development, it has been deemed desirable to provide multiple units of a single type of universal distributed I/O device D (labeled as D1,D2,D3a,D3b but shown generally at D in FIG. 5) that can function as any one of the above I/O devices: (1) as a block I/O device D1; (2) as a network adapter module D2; (3) as an end I/O module D3a; or, (4) as an intermediate I/O module D3b. Furthermore, the device D is intelligent and self-determining in that it performs an initialization process by which it determines its role according to its operative location in an industrial control system S'.

Figure 5:
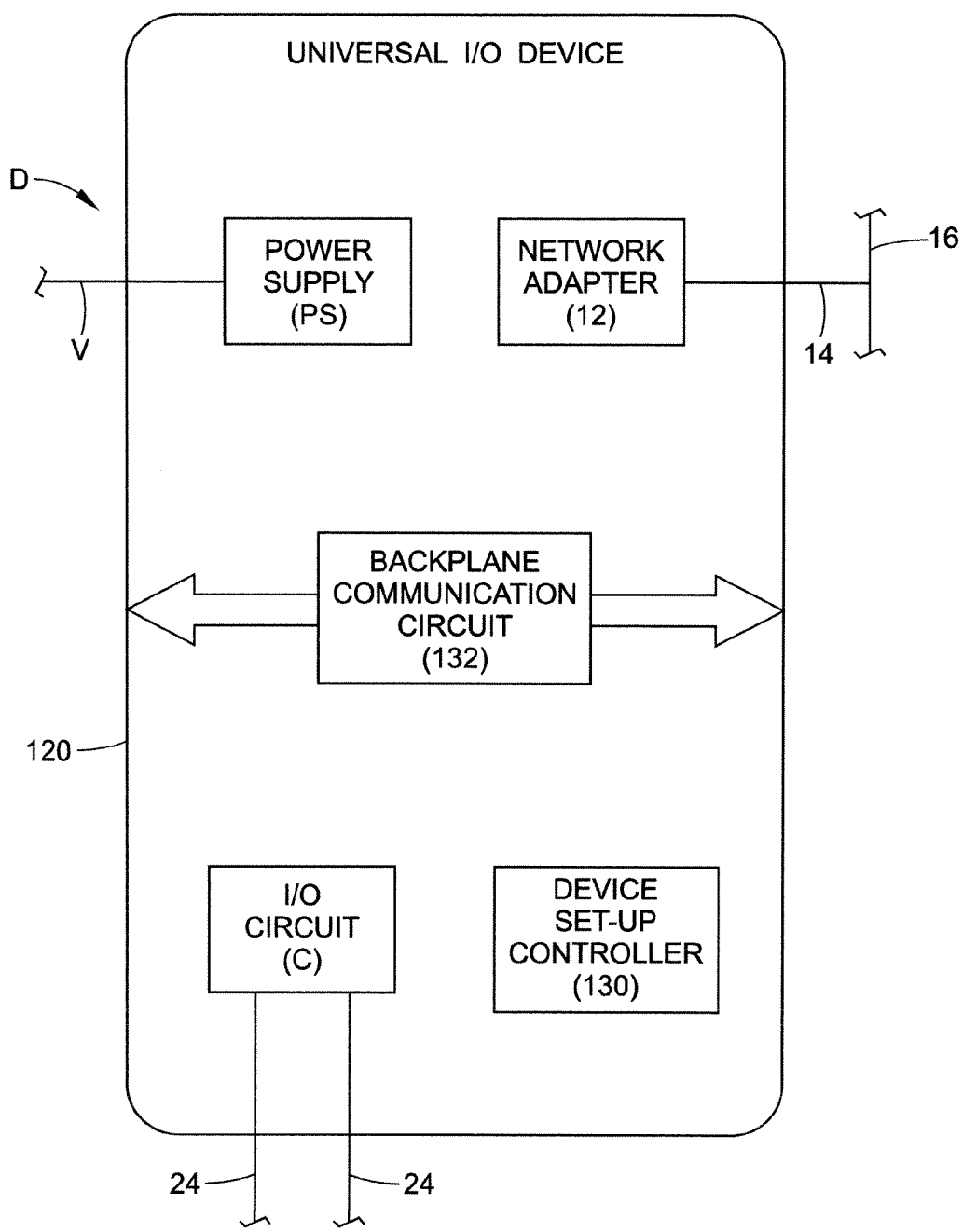
FIG. 5 is a diagrammatic illustration of a single intelligent self-determining I/O device formed in accordance with the present development.

With reference now to FIG. 5, each I/O device D comprises a housing or enclosure 120 that is sealed to prevent ingress of environmental contamination such as water, air, dirt, etc. In one example, the housing 120 meets standards such as IP67 NEMA 4X/6P and the like. The device D must be able to function as a conventional block I/O device and, thus, the housing 120 contains all components of a block I/O device such as the device 10b described above, i.e., a power supply PS, a network adapter 12, at least one I/O circuit C. The I/O circuit C communicates with a process 26 (not shown in FIG. 5) via I/O lines 24 that connect to the I/O circuit via conventional plug type connectors or the like. The power supply PS is connected to a voltage input line V. The network adapter 12 is connected to data network 16 via connection 14.

Unlike a conventional block I/O device 10b, the device D further comprises a device setup controller 130 and a backplane communication circuit 132. The device setup controller 130 is provided as any suitable electronic controller device such as a programmed general purpose microcontroller or another device such as a dedicated electronic circuit, e.g., an ASIC, and is configured to control operation of the device D and, in particular, an initialization process (FIG. 6) by which the device D performs a self-determination routine in order to identify its intended use based upon its operative installed location in an industrial automation system S'.

The backplane communication circuit 132 is provided as any suitable wired or wireless communication circuit by which the device D is able to transmit I/O and associated data upstream (i.e., toward the industrial controller 100) or downstream (i.e., away from the industrial controller 100) to another device D and/or to the controller 100 via network 16 as disclosed above in connection with the backplane 18 of modular I/O device 10. Upstream and downstream devices D are connected to each other by way of the backplane communication circuit 132 using electrical and/or fiber optic cables and/or wireless protocols to construct a data backplane 118 (FIG. 4) by which the upstream and downstream devices D send and receive I/O data to/from each other and, ultimately, to/from the industrial controller 100. It should be noted that if a wireless protocol is implemented by the backplane communication circuit 132, it should be short-range and/or line-of-sight or otherwise configured to ensure that a plurality of the devices D that form part of a control system S' do not receive extraneous backplane data signals, i.e., each device D must be able to determine its location relative to any other devices D as described below and extraneous backplane data signals could be undesirable to this process. Examples of suitable communications circuits to be implemented by the backplane communication circuit 132 include hard-wired circuits and/or wireless circuits.

Figure 6:
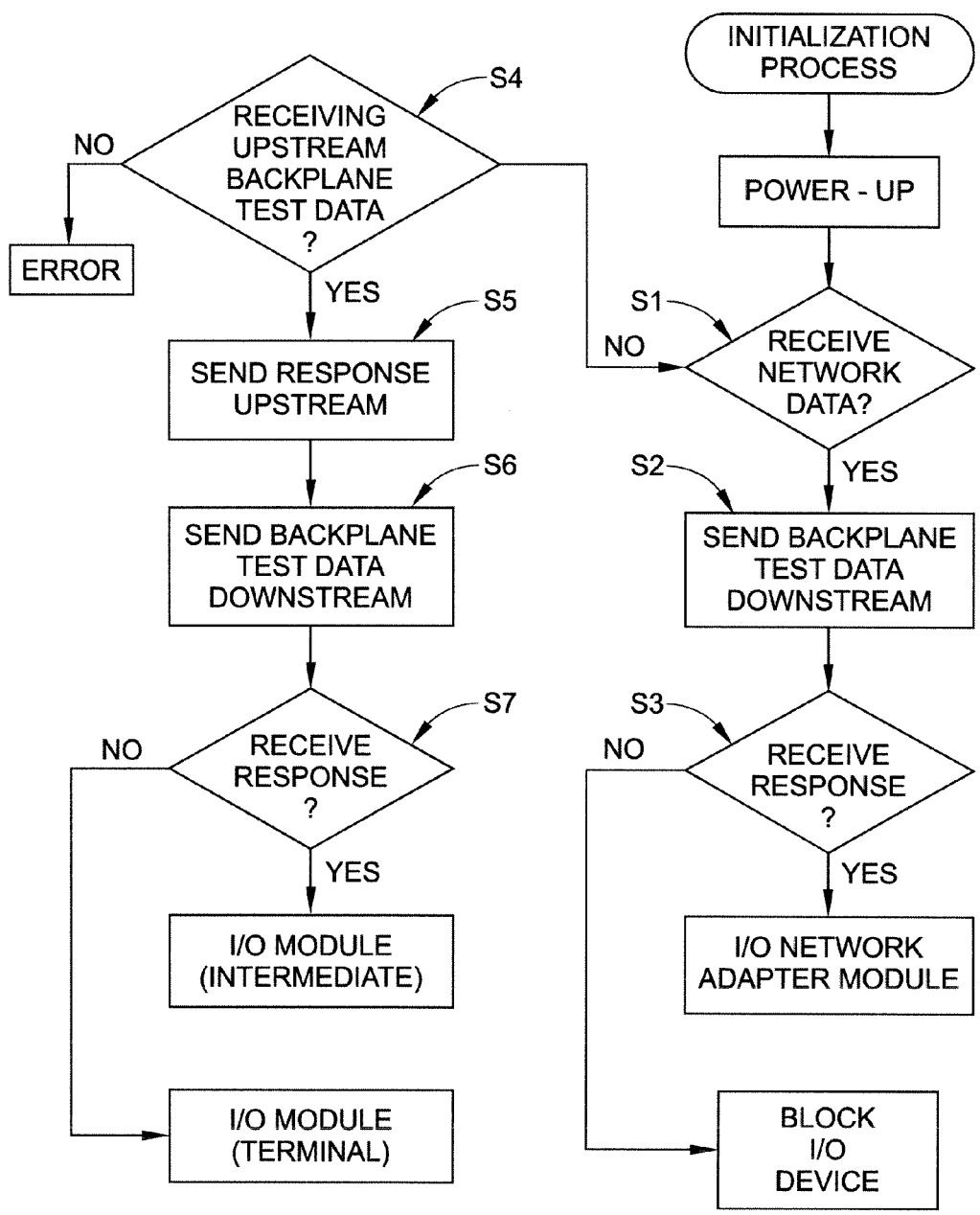
FIG. 6 is a flow chart that discloses an initialization process for an intelligent self-determining I/O device formed in accordance with the present development.

FIG. 6 illustrates the initialization process implemented by the device setup controller 130 upon power-up of each universal I/O device D installed in the control system S'. In a step S1, the setup controller 130 determines if the device D is receiving network data into the network adapter 12. If yes, the setup controller 130 implements a step S2 to send backplane test data downstream via backplane communication circuit 132. A step S3 is then implemented by the setup controller 130 to determine if a response/acknowledgement to the data sent in step S2 is received via backplane communication circuit 132. If not, the setup controller 130 sets the configuration of the device D as a stand-alone block I/O device as shown at D1 in FIG. 4. If the setup controller 130 determines via step S3 that a response is received to the data sent in step S2, the controller sets the configuration of the device D as an I/O network adapter module as shown at D2 in FIG. 4.

If the setup controller determines through the step S1 that no network data are being received into the network adapter 12, control passes to a step S4 wherein the setup controller 130 checks to see if upstream backplane test data (i.e., data from upstream) are being received via backplane communication circuit 132. If not, the setup controller 130 determines that an error condition is present because the device D is not receiving any network data and is not receiving any upstream backplane test data. If the step S4 indicates that upstream backplane test data are being received via backplane communication circuit 132, the setup controller 130 carries out a step S5 to send a response upstream (i.e., an acknowledgement signal) on the backplane communication circuit 132 to the device D from which the upstream backplane test data are being received.

Before or after or concurrently with step S5, the setup controller 130 implements a step S6 to send backplane test data downstream via backplane communication circuit 132. In a step S7, the setup controller 130 checks to see if any acknowledgement response is received on the backplane communication circuit 132 to the data sent downstream in step S6. If a response is received according to step S7, the setup controller 130 configures the device D as an intermediate I/O module as shown at D3b in FIG. 4; if no response is received according to the step S7, the setup controller 130 configures the device D as a terminal I/O module as shown at D3a in FIG. 4.

It should be noted that each device D used in an industrial control system S' can have a different I/O circuit C relative to the other devices used in the system S'. The I/O circuit C of each device is configured with the needed input/output connectors for mating with I/O lines 24 and other capabilities (e.g., digital, analog, etc.) as needed.

Modifications and alterations will occur to those of ordinary skill in the art. It is intended that the following claims be construed literally and/or according to the doctrine of equivalents so as to encompass all such modifications and alterations to the fullest extent available under the law.

The invention claimed is:

1. A universal input/output device for an industrial automation control system, said device comprising:

a housing;

a power supply for connecting to a voltage source;

an input/output circuit for communicating with an industrial process;

a network adapter circuit for communicating data to and from an industrial automation control system data network;

a backplane communication circuit for sending backplane data upstream and downstream; and, a device setup control circuit that performs an initialization process to configure said device as one of: (i) a stand-alone block I/O device; (ii) a network adapter module of a modular I/O device; or (iii) an I/O module of a modular I/O device depending upon how said device is operably connected to said industrial automation data network, wherein said device setup control circuit comprises:

means for detecting if said network adapter circuit is directly operably connected to said data network; and means for detecting if said backplane communication circuit is operably connected to a backplane;

wherein said device setup control circuit configures said device as one of:

a stand-alone block I/O device if said network adapter circuit is directly operably connected to said data network and said backplane communication circuit is not operably connected to a backplane;

a network adapter module if said network adapter circuit is directly operably connected to said data network and said backplane communication circuit is operably connected to a backplane;

an I/O module of a modular I/O device if said network adapter circuit is not directly operably connected to said data network and said backplane communication circuit is operably connected to a backplane downstream from another one of said universal input/output devices.

2. The universal input/output device as set forth in claim 1, wherein, when said device setup control circuit configures said device as an I/O module, said device setup control circuit further configures said device as one of: (i) a terminal I/O module; or, (ii) a intermediate I/O module, depending upon whether said backplane communication circuit detects only upstream backplane data or both upstream and downstream backplane data, respectively.

3. The universal input/output device as set forth in claim 2, wherein said device setup control circuit comprises means for sending and receiving backplane test data to adjacent devices via said backplane communication circuit, and wherein said setup control circuit configures said device as one of: (i) a terminal I/O module; or, (ii) a intermediate I/O module based upon receipt of an acknowledgement response from an adjacent device via said backplane communication circuit.

4. The universal input/output device as set forth in claim 3, wherein said backplane communication circuit comprises a wireless communication circuit for sending and receiving wireless backplane data to upstream and downstream devices.

5. A method for constructing an industrial automation control system, said method comprising:

connecting a plurality of intelligent self-determining I/O devices to a data network;

performing an initialization routine with each of said intelligent self-determining I/O devices, said initialization routine comprising for each of said plurality of intelligent self-determining I/O devices:

(a) determining if network data are being received into a network adapter circuit of said device;

(b) determining if upstream backplane test data are being received into a backplane communication circuit of said device;

(c) determining if downstream backplane test data are being received into said backplane communication circuit of said device; and, (d) configuring said device as one of (i) a stand-alone block I/O device; (ii) a network adapter module of a modular I/O device; or (iii) an I/O module of a modular I/O device based upon which of network data, upstream backplane test data, and downstream backplane test data are received into said device, wherein said configuring step comprises configuring said device as either:

a stand-alone block I/O device if said network adapter circuit is directly operably connected to said data network and said backplane communication circuit is not receiving either of said upstream backplane test data or said downstream backplane test data;

a network adapter module if said network adapter circuit is directly operably connected to said data network and said backplane communication circuit is operably receiving downstream backplane test data;

an I/O module of a modular I/O device if said network adapter circuit is not directly operably connected to said data network and said backplane communication circuit is operably receiving at least one of said upstream and downstream backplane test data.

* * * * *